UNITED STATES PATENT OFFICE.

THOMAS BRAGG, OF WEST MILTON, OHIO.

IMPROVEMENT IN THE MANUFACTURE OF STARCH FROM MAIZE.

Specification forming part of Letters Patent No. 7,850, dated December 24, 1850.

*To all whom it may concern:*

Be it known that I, THOMAS BRAGG, of West Milton, in the county of Miami and State of Ohio, have invented new and useful Improvements in the Manufacture of Starch; and I do hereby declare the following to be a full, clear, and exact description of the nature of my invention and of the process which I have adopted.

The object of my improvement in the manufacture of starch is the more complete extraction of the starchy matter by the liberation of that portion which, in the natural grain, is too intimately blended with insoluble matter to yield to the ordinary disintegration and maceration.

My process has more especial reference to maize or Indian corn and grain or seeds of similar character remarkable for the peculiar intricability of their insoluble substances, which, while inaccessible to mechanical agencies, are, from the tendency of their particles to rapid putrescent decomposition, unfitted for any of the fermenting processes employed upon wheat for the liberation of its starchy farina.

In the manufacture of starch from maize as usually practiced it is obtained by maceration and grinding, by which process a residuum amounting to fully one-half of the entire amount of sediment—heavier than the starch, and apparently insoluble for all practical purposes— is found at the bottom of the vat into which the proceeds of the maceration are deposited. This extensive residuum, answering to the characteristics of hordeine, being rejected as intractable, occasions a vast sacrifice of material in the production of starch from this description of grain. This residuum yields to the fermenting process, but with such activity as to pass rapidly to a destructive decomposition.

In the manufacture of starch from wheat it has been obtained by steeping, followed either by pressure in bags or by grinding and subsequent elutriation, the intractable matters being in some cases afterward subjected to fermentation for the extraction of the residuum of starch which may not have been separated by the mechanical action of the water. It has been obtained from wheaten meal by fermentation and subsequent elutriation.

The old process with wheaten meal was to steep it in water, when, being resigned to fermentation, the starchy matter was liberated, and the gluten, becoming soluble in the alcohol and acetic acid resulting from the fermentation of the mucilage, sugar, and other matters held in solution, was decanted off with them, leaving the starch at the bottom of the vat. The free starch of corn has been obtained by steeping, elutriation, and treatment with caustic alkalies and acids, these substances being employed, as is the fermentation in the wheaten meal, for the purpose of rendering the gluten soluble to facilitate its removal. The fermentation of corn-meal is so rapid and so quickly reaches an acetous stage that this process in the manufacture of starch (though made the subject of a patent in England) is of slight practical value, owing to the difficulty of hitting the precise time at which to arrest it, it being also a matter of doubt whether it is possible to allow sufficient of the fermentative action to take place to resolve the insoluble portions without allowing other principles to pass into a stage in which they would prove destructive to the mass.

I now proceed to explain as briefly as the nature of the case will permit the theory and practice of the process made available by me for the elaboration or liberation of the imprisoned starch, by which I am enabled to extract a much larger per centum of starch than has been obtained by simple elutriation or by the alkaline treatment.

I have found that with the employment of the vegetative action in unbroken Indian corn sufficient fermentation may be allowed to take place to resolve the hordeine and to render soluble the gluten without impairing to any considerable degree the integrity of the starch, owing to the assimilation by the germ of the saccharine principle as fast as it is developed, thereby preventing it from passing into a stage of destructive decomposition, in which it would corrupt. Analysis has shown that during the early stages of germinative fermentation an additional quantity of starch is developed, while the sugar, mucilage, &c., are diminished in quantity from their being dissimilated with the germ. In the process of germination as adopted by me for this purpose the hordeine is decomposed preparatory to its elaboration as sustenance for the germ, and assumes a soluble form, liberating starch. The manipulation at this stage is one of great nicety, and can only be performed successfully after considerable experience and attention on the part of the operator. The point at which the greatest amount of starch is free will vary more or less with varying circumstances. Analysis and experiments may determine it. I have found the corn in a suitable state when the radicle has attained a length of above one inch, and I have adopted that as the standard. The germination is arrested at the proper stage by the grinding and maceration of the corn, followed by elutriation with water in sieve or by any of the usual methods whence the farinaceous matter is passed through into a receiver, and the proof of the problem becomes visible, inasmuch as there is no insoluble deposit formed; but the starch having subsided, the remaining constituents of the farina are decanted off into appropriate vessels.

The time occupied in steeping is usually about two days, when it is removed from the vats and spread in couches upon a floor, where it is allowed to germinate two or three days, these times varying with the temperature of the water, of maceration, atmosphere, &c. The best yield of starch from corn by the alkaline process is, so far as my information and experience go, from nineteen to twenty pounds from the bushel of corn, (fifty-six pounds)—that is, something over thirty-five per cent. in weight. I strain twenty-eight pounds from the bushel of corn—that is, fifty per cent.—which more nearly corresponds with the chemical analysis.

Having thus fully described the nature of my invention and my process for the extraction of starch from corn and other similar grain or seeds, what I claim therein as new, and desire to secure by Letters Patent, is—

The method, substantially as described, of extracting from maize and other grain or seeds subject to rapid putrescent decomposition that portion of the starch which is inextricable either by mechanical means or by fermentation of the meal by the subjection of the unbroken grain to an incipient germination, which is arrested at that stage of the vegetative action at which starch that exists in an insoluble condition, being liberated, is capacitated for precipitation along with the free starch by any of the usual processes of maceration and elutriation.

In testimony whereof I have hereunto set my hand before two subscribing witnesses.

THOMAS BRAGG.

Witnesses:
   EDWARD H. KNIGHT,
   THOMAS KILT.